US011191050B2

United States Patent
Zhu et al.

(10) Patent No.: US 11,191,050 B2
(45) Date of Patent: Nov. 30, 2021

(54) COMMUNICATION PROCESSING METHOD AND APPARATUS

(71) Applicant: Huawei Technologies Co., Ltd., Shenzhen (CN)

(72) Inventors: Yuanping Zhu, Shanghai (CN); Mingzeng Dai, Shanghai (CN); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/884,320

(22) Filed: May 27, 2020

(65) Prior Publication Data
US 2020/0288420 A1   Sep. 10, 2020

Related U.S. Application Data

(63) Continuation of application No. PCT/CN2018/115015, filed on Nov. 12, 2018.

(30) Foreign Application Priority Data

Nov. 27, 2017   (CN) .......................... 201711202769.1

(51) Int. Cl.
*H04W 56/00*   (2009.01)

(52) U.S. Cl.
CPC ....... *H04W 56/003* (2013.01); *H04W 56/005* (2013.01); *H04W 56/0015* (2013.01)

(58) Field of Classification Search
CPC ........... H04W 56/003; H04W 56/0015; H04W 56/005; H04W 56/00; H04J 3/0673; H04J 3/0667
See application file for complete search history.

(56) References Cited

U.S. PATENT DOCUMENTS

| 2007/0076650 | A1* | 4/2007 | Manjeshwar | ......... H04W 72/02 370/328 |
| 2008/0043747 | A1 | 2/2008 | Zheng | |
| 2009/0196277 | A1* | 8/2009 | Horn | ..................... H04J 3/0641 370/350 |
| 2010/0014460 | A1 | 1/2010 | Shin et al. | |
| 2013/0243114 | A1* | 9/2013 | Sugiyama | ............. H04L 7/0016 375/295 |
| 2014/0177653 | A1 | 6/2014 | Tzeng | |

(Continued)

FOREIGN PATENT DOCUMENTS

| CN | 101510849 A | 8/2009 |
| CN | 103078699 A | 5/2013 |

(Continued)

*Primary Examiner* — Ashley Shivers
(74) *Attorney, Agent, or Firm* — Slater Matsil, LLP

(57) ABSTRACT

This application provides a communication processing method and apparatus. The method includes: receiving, by a target node, a second message sent by a synchronization source node via at least one intermediate node, where the second message carries a receiving time of a first message from the target node at the synchronization source node and waiting time information of the first message at each of the at least one intermediate node; and determining, by the target node, a clock deviation between the target node and the synchronization source node based on a sending time of the first message at the target node and the second message.

18 Claims, 6 Drawing Sheets

(56) References Cited

U.S. PATENT DOCUMENTS

| | | | |
|---|---|---|---|
| 2015/0085852 A1* | 3/2015 | Mizutani | H04J 3/0667 370/350 |
| 2016/0149692 A1 | 5/2016 | Kim et al. | |
| 2017/0150464 A1 | 5/2017 | Kazehaya et al. | |
| 2017/0353933 A1* | 12/2017 | Xhafa | H04W 56/001 |

FOREIGN PATENT DOCUMENTS

| | | |
|---|---|---|
| CN | 103957589 A | 7/2014 |
| CN | 104105195 A | 10/2014 |
| CN | 105141390 A | 12/2015 |
| WO | 2016092244 A1 | 6/2016 |

\* cited by examiner

COMMUNICATION PROCESSING METHOD AND APPARATUS

CROSS-REFERENCE TO RELATED APPLICATIONS

This application is a continuation of International Application No. PCT/CN2018/115015, filed on Nov. 12, 2018, which claims priority to Chinese Patent Application No. 201711202769.1, filed on Nov. 27, 2017, The disclosures of the aforementioned applications are hereby incorporated by reference in their entireties.

TECHNICAL FIELD

This application relates to the communications field, and in particular, to a communication processing method and apparatus in the communications field.

BACKGROUND

With development of communications technologies, a communications system imposes increasingly strict requirements on clock synchronization. For a basic service in a time division duplex (TDD) system, if base stations of neighboring cells cannot keep synchronous, severe uplink-downlink interference may be caused. In some technologies such as coordinated multipoint (COMP) and a multicast-broadcast single-frequency network (MBSFN) that require coordination between base stations, a requirement on synchronization between sites is stricter. In a 5th generation (5G) mobile communications technology, a design of a wider subcarrier (for example, 15 kHz, 30 kHz, 60 kHz, 120 kHz, or 240 kHz) is introduced. Because a subcarrier width is inversely proportional to a subframe length, a wider subcarrier indicates a corresponding shorter guard period (GP) and cyclic prefix (CP), and a smaller allowed synchronization error. Therefore, 5G new radio (NR) imposes a higher requirement on synchronization between sites than an existing 4th generation mobile communications system and other systems.

In a wired network, for example, an Internet Protocol (IP) network, a common synchronization technology is mainly based on the institute of electrical and electronics engineers (IEEE) 1588 protocol. A principle of the synchronization technology is that an IEEE 1588 message with an accurate timestamp is transferred between a primary device and a secondary device, and is used to calculate a time offset and a frequency offset, to implement microsecond-level frequency and time synchronization between the primary device and the secondary device. However, according to the method, a synchronization error is transferred hop by hop in a multi-hop wireless relay network scenario. For example, 1-µs synchronization precision between sites is implemented in a one-hop solution but greatly lowers to a 3-µs level in three-hop transmission. Therefore, in a multi-hop networking scenario, a hop-by-hop synchronization solution limits a hop count supported by a network. In a cross-hop synchronization solution, a target node that is to perform synchronization only needs to perform clock synchronization with a synchronization source node that serves as a clock source, and an intermediate node serves as a transparent transmission node to directly forward data. However, it is assumed in this method that a delay of data from the synchronization source node to the target node is the same as a delay from the target node to the synchronization source node, and this assumption causes a comparatively low precision in clock synchronization. In a wireless relay networking scenario, especially a multi-hop relay scenario, how to improve precision in clock synchronization is a technical problem that needs to be urgently resolved.

SUMMARY

This application provides a communication processing method and apparatus, to improve precision in clock synchronization in a multi-hop relay scenario.

According to a first aspect, a communication processing method is provided, including: receiving, by a target node, a second message sent by a synchronization source node via at least one intermediate node, where the second message carries a receiving time of a first message from the target node at the synchronization source node and waiting time information of the first message at each of the at least one intermediate node; and determining, by the target node, a clock deviation between the target node and the synchronization source node based on a sending time of the first message at the target node and the time information in the second message.

According to the communication processing method in the embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance.

It should be understood that the foregoing waiting time information may include a time at which the first intermediate node receives the first message and a time at which the first intermediate node sends the first message, or may include a difference between the time at which the first intermediate node sends the first message and the time at which the first intermediate node receives the first message. This is not limited in the embodiment of this application.

It should be further understood that a source address of the first message is an address of the target node, a destination address of the first message is an address of the synchronization source node, a source address of the second message is an address of the synchronization source node, and a destination address of the second message is an address of the target node. The first intermediate node may forward a received message according to a routing protocol. In specific implementation, the target node and the synchronization source node may explicitly carry corresponding fields of the source address and the destination address in a to-be-sent message, or may indicate the source address and the destination address of the to-be-sent message in an implicit manner (for example, a channel, a bearer, or a special message type). This is not limited in the embodiment of this application.

In this specification, only the waiting time information is added by the intermediate node in a message processing process, and a format and other content of the message do not change. Therefore, for ease of description, the first message received by the first intermediate node is still referred to as the first message after the first intermediate node adds the waiting time information. The same holds true for a second message and third message, and details are not described again.

In a specific implementation, the foregoing node (for example, the target node, the intermediate node, or the synchronization source node) may determine the sending time of the message based on a start time or an end time of a physical layer frame or a subframe in which the node sends the message. Similarly, the foregoing node may determine the receiving time of the message based on a start time or an end time of a physical layer frame or a subframe in which the node receives the message.

In a possible implementation, the target node may send a plurality of first messages to the synchronization source node. The first intermediate node may add waiting time information to one of the first messages, and notify the target node of the selected first message, so that the target node may subsequently calculate the clock deviation between the target node and the synchronization source node based on a sending time of the first message selected by the first intermediate node and the time information in the received second message.

With reference to the first aspect, in some implementations of the first aspect, the second message further carries a sending time of the second message at the synchronization source node and waiting time information of the second message at each intermediate node; and the determining, by the target node, a clock deviation between the target node and the synchronization source node based on a sending time of the first message at the target node and the time information in the second message includes: determining, by the target node, the clock deviation between the target node and the synchronization source node based on the sending time of the first message at the target node, a receiving time of the second message at the target node, and the time information in the second message.

In the embodiment of this application, clock synchronization can be implemented through transferring of two messages. This reduces signaling interaction between the target node and the synchronization source node.

Specifically, the synchronization source node may record the sending time of the second message, and add the sending time of the second message to the second message for sending. The first intermediate node receives the second message sent by the synchronization source node, where the second message carries the sending time of the first message, the receiving time of the first message, the waiting time information of the first message at the intermediate node, and the sending time of the second message. The first intermediate node may add the waiting time information of the second message at the first intermediate node to the second message, and send the second message. The target node receives the second message, and records the receiving time of the second message. The second message received by the target node carries the receiving time of the first message, the waiting time information of the first message at the intermediate node, the sending time of the second message, and the waiting time information of the second message at the first intermediate node. Therefore, the target node may determine the clock deviation between the target node and the synchronization source node based on the sending time of the first message, the receiving time of the first message, the waiting time information of the first message at the intermediate node, the sending time of the second message, the waiting time information of the second message at the first intermediate node, and the receiving time of the second message.

With reference to the first aspect, in some implementations of the first aspect, the determining a clock deviation between the target node and the synchronization source node includes:

determining, by the target node, the clock deviation between the target node and the synchronization source node according to the following formula:

$$T = \left[(T_4 - T_3) - (T_2 - T_1) - \left(\sum_j T_j^{(wd)} - \sum_j T_j^{(wu)}\right)\right]\bigg/2$$

$T_4$ is the receiving time of the second message at the target node, $T_3$ is the sending time of the second message at the synchronization source node, $T_2$ is the receiving time of the first message at the synchronization source node, and $T_1$ is the sending time of the first message at the target node. A quantity of the at least one intermediate node is N, where N is an integer greater than or equal to 1. j is used to represent a number of the at least one intermediate node, where j=1, ..., N. $T_j^{(wd)}$ is a waiting time of the second message at an intermediate node j, and $T_j^{(wu)}$ is a waiting time of the first message at the intermediate node j.

With reference to the first aspect, in some implementations of the first aspect, before the sending, by the target node, a first message to the synchronization source node via at least one intermediate node, the method further includes: receiving, by the target node, a third message sent by the synchronization source node via the at least one intermediate node, where the third message carries a sending time of the third message at the synchronization source node and waiting time information of the third message at each intermediate node; and sending, by the target node based on the third message, the first message to the synchronization source node via the at least one intermediate node. The determining, by the target node, a clock deviation between the target node and the synchronization source node based on a sending time of the first message at the target node and the time information in the second message includes: determining, by the target node, the clock deviation between the target node and the synchronization source node based on the sending time of the first message at the target node, the time information in the second message, a receiving time of the third message at the target node, and the time information in the third message.

Specifically, the synchronization source node may record the sending time of the third message, and add the sending time of the third message to the third message for sending. The first intermediate node receives the third message, adds waiting time information of the third message at the first intermediate node to the third message, and sends the third message. The target node receives the third message, and records the receiving time of the third message. The third message received by the target node carries the sending time of the third message at the synchronization source node and the waiting time information of the third message at the first intermediate node.

After receiving the third message, the target node sends the first message whose destination address is the synchronization source node, and records the sending time of the first message. The first message passes through the first intermediate node, and the first intermediate node adds the waiting time information of the first message at the first intermediate node to the first message, and then sends the first message. The synchronization source node receives the first message, records the receiving time of the first message, and then sends the second message whose destination address is the address of the target node. The first message received by the synchronization source node carries the waiting time information that is of the first message at the first intermediate node and that is added by the first intermediate node. Subsequently, the synchronization source node adds the receiving time of the first message and the waiting time information of the first message at the first intermediate node to the second message, and sends the second message to the target node.

The second message passes through the first intermediate node and arrives at the target node. The target node may determine the clock deviation between the target node and the synchronization source node based on the previously recorded sending time of the first message, the sending time of the third message at the synchronization source node, the receiving time of the third message at the target node, the waiting time information of the third message at the first intermediate node, and the receiving time of the first message at the synchronization source node and the waiting time information of the first message at the intermediate node that are carried in the second message.

Optionally, the third message may be a synchronization (Sync) notification. However, this is not limited in the embodiment of this application. In addition, the third message may be periodically sent by the synchronization source node, or may be sent by the synchronization source node as triggered by an event. For example, the synchronization source node sends the third message after receiving a synchronization request of the target node. This is not limited in the embodiment of this application.

With reference to the first aspect, in some implementations of the first aspect, the determining a clock deviation between the target node and the synchronization source node includes: determining, by the target node, the clock deviation between the target node and the synchronization source node according to the following formula:

$$T = \left[ (T_6 - T_5) - (T_2 - T_1) - \left( \sum_j T_j^{(wd)} - \sum_j T_j^{(wu)} \right) \right] / 2$$

$T_6$ is the receiving time of the third message at the target node, $T_5$ is the sending time of the third message at the synchronization source node, $T_2$ is the receiving time of the first message at the synchronization source node, and $T_1$ is the sending time of the first message at the target node. A quantity of the at least one intermediate node is N, where N is an integer greater than or equal to 1. j is used to represent a number of the at least one intermediate node, where j=1, ..., N. $T_j^{(wd)}$ is a waiting time of the third message at the intermediate node j, and $T_j^{(wu)}$ is the waiting time of the first message at the intermediate node j.

With reference to the first aspect, in some implementations of the first aspect, the third message is sent by the synchronization source node and the at least one intermediate node in a broadcast or multicast manner.

Specifically, the third message may be sent by the synchronization source node and the first intermediate node in a broadcast or multicast manner. This can further reduce signaling overheads between sites.

With reference to the first aspect, in some implementations of the first aspect, before the receiving, by a target node, a second message sent by a synchronization source node via at least one intermediate node, the method further includes: sending, by the target node, a synchronization request message to the synchronization source node via the at least one intermediate node, where the synchronization request message is used to request to perform clock synchronization with the synchronization source node; and receiving, by the target node, a synchronization response message sent by the synchronization source node via the at least one intermediate node, where the synchronization response message is used to indicate that the synchronization source node accepts or rejects a synchronization request of the target node.

Specifically, before performing clock synchronization, the target node may send the synchronization request message to the synchronization source node via the at least one intermediate node, to request to perform clock synchronization with the synchronization source node. The at least one intermediate node that includes the first intermediate node directly forwards the synchronization request message. The synchronization source node receives the synchronization request message, and when the synchronization source node agrees to serve as a synchronization source of the target node, the synchronization source node sends the synchronization response message to the target node via the at least one intermediate node. The at least one intermediate node that includes the first intermediate node directly forwards the synchronization response message. The target node receives the synchronization response message, and sends the first message based on the synchronization response message.

With reference to the first aspect, in some implementations of the first aspect, the method further includes: sending, by the target node, a fourth message, where the fourth message is used to indicate a hop count between the target node and the synchronization source node, and the hop count is used by another target node to determine whether to perform clock synchronization with the target node.

It should be understood that the synchronization source node that can be used as a reference may be a GPS synchronization capable node, a node that synchronizes with a transport network according to an IEEE 1588 protocol, or the like. This is not limited in the embodiment of this application. It should be further understood that the target node may send the fourth message in a multicast or unicast manner. This is not limited in the embodiment of this application either.

Specifically, each of nodes in a network may send a hop count between the node and the synchronization source node that can be used as a reference, to help another node that needs to perform clock synchronization select a synchronization source. In a possible implementation, another target node may select a node with a minimum hop count as the synchronization source, and perform clock synchronization with the node with the minimum hop count.

According to a second aspect, another communication processing method is provided, including: receiving, by a synchronization source node, a first message sent by a target node via at least one intermediate node, where the first message carries waiting time information of the first message at each of the at least one intermediate node; and sending, by the synchronization source node based on the first message, a second message to the target node via the at least one intermediate node, where the second message carries a receiving time of the first message at the synchronization source node and the waiting time information of the first message at each of the at least one intermediate node.

With reference to the second aspect, in some implementations of the second aspect, the second message further carries a sending time of the second message at the synchronization source node.

With reference to the second aspect, in some implementations of the second aspect, where before the receiving, by a synchronization source node, a first message sent by a target node via at least one intermediate node, the method further includes: sending, by the synchronization source node, a third message to the target node via the at least one intermediate node, where the third message carries a sending time of the third message at the synchronization source node.

With reference to the second aspect, in some implementations of the second aspect, the third message is sent by the synchronization source node in a broadcast or multicast manner.

With reference to the second aspect, in some implementations of the second aspect, before the receiving, by a synchronization source node, a first message sent by a target node via at least one intermediate node, the method further includes: receiving, by the synchronization source node, a synchronization request message sent by the target node via the at least one intermediate node, where the synchronization request message is used to request to perform clock synchronization with the synchronization source node; and sending, by the synchronization source node based on the synchronization request message, a synchronization response message to the target node via the at least one intermediate node, where the synchronization response message is used to indicate that the synchronization source node accepts or rejects a synchronization request of the target node.

According to a third aspect, still another communication processing method is provided, including: adding, by a first intermediate node, waiting time information of a first message at the first intermediate node to the first message from a target node, and sending the first message; receiving, by the first intermediate node, a second message, where the second message carries a receiving time of the first message at a synchronization source node and waiting time information of the first message at each of at least one intermediate node, and the at least one intermediate node includes the first intermediate node; and sending, by the first intermediate node, the second message.

With reference to the third aspect, in some implementations of the third aspect, the sending, by the first intermediate node, the second message includes: adding, by the first intermediate node, waiting time information of the second message at the first intermediate node to the second message, and sending the second message.

With reference to the third aspect, in some implementations of the third aspect, before the adding, by a first intermediate node, waiting time information of a first message at the first intermediate node to the first message from a target node, and sending the first message, the method further includes: receiving, by the first intermediate node, a third message, where the third message carries a sending time of the third message at the synchronization source node; adding, by the first intermediate node, waiting time information of the third message at the first intermediate node to the third message; and sending, by the first intermediate node, the third message.

With reference to the third aspect, in some implementations of the third aspect, the third message is sent by the synchronization source node and the first intermediate node in a broadcast or multicast manner.

With reference to the third aspect, in some implementations of the third aspect, before the adding, by a first intermediate node, waiting time information of a first message at the first intermediate node to the first message from a target node, and sending the first message, the method further includes: receiving, by the first intermediate node, a synchronization request message, where the synchronization request message is used to request to perform clock synchronization with the synchronization source node; forwarding, by the first intermediate node, the synchronization request message; receiving, by the first intermediate node, a synchronization response message, where the synchronization response message is used to indicate that the synchronization source node accepts or rejects a synchronization request of the target node; and forwarding, by the first intermediate node, the synchronization response message.

With reference to the third aspect, in some implementations of the third aspect, the method further includes: sending, by the first intermediate node, a fifth message, where the fifth message is used to indicate a hop count between the first intermediate node and the synchronization source node, and the hop count is used by another target node to determine whether to perform clock synchronization with the first intermediate node.

With reference to the third aspect, in some implementations of the third aspect, the first intermediate node is a terminal device or a relay node.

According to a fourth aspect, a communication processing apparatus is provided, configured to perform the method in the first aspect or any possible implementation of the first aspect. Specifically, the terminal device includes units configured to perform the method according to any one of the first aspect or the possible implementations of the first aspect.

According to a fifth aspect, another communication processing apparatus is provided, configured to perform the method in the second aspect or any possible implementation of the second aspect. Specifically, the apparatus includes units configured to perform the method in the second aspect or any possible implementation of the second aspect.

According to a sixth aspect, still another communication processing apparatus is provided, configured to perform the method in the second aspect or any possible implementation of the second aspect. Specifically, the apparatus includes a unit configured to perform the method according to any one of the third aspect or the possible implementations of the third aspect.

According to a seventh aspect, yet another communication processing apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the first aspect or the possible implementations of the first aspect.

According to an eighth aspect, still yet another communication processing apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the second aspect or the possible implementations of the second aspect.

According to a ninth aspect, a further another communication processing apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the third aspect or the possible implementations of the third aspect.

According to a tenth aspect, a communication processing system is provided, where the system includes the apparatus in the third aspect or any possible implementation of the third aspect, the apparatus in the fourth aspect or any possible implementation of the fourth aspect, and the apparatus in the fifth aspect or any possible implementation of the fifth aspect.

Alternatively, the system includes the apparatus in the sixth aspect or any possible implementation of the sixth aspect, the apparatus in the seventh aspect or any possible implementation of the seventh aspect, and the apparatus in the eighth aspect or any possible implementation of the eighth aspect.

According to an eleventh aspect, a computer program product is provided. The computer program product includes computer program code, and when the computer program code is run on a computer, the computer is enabled to perform the method in the first aspect or any possible implementation of the first aspect.

According to a twelfth aspect, a computer program product is provided. The computer program product includes computer program code, and when the computer program code is executed by a computer, the computer is enabled to perform the method in the second aspect or any possible implementation of the second aspect.

According to a thirteenth aspect, a computer program product is provided. The computer program product includes computer program code, and when the computer program code is executed by a computer, the computer is enabled to perform the method in the third aspect or any possible implementation of the third aspect.

According to a fourteenth aspect, a computer-readable medium is provided, where the computer readable medium is configured to store a computer program. The computer program includes an instruction used to perform the method in the first aspect or any possible implementation of the first aspect.

According to a fifteenth aspect, a computer-readable medium is provided, where the computer readable medium is configured to store a computer program. The computer program includes an instruction used to perform the method in the second aspect or any possible implementation of the second aspect.

According to a sixteenth aspect, a computer-readable medium is provided, where the computer readable medium is configured to store a computer program. The computer program includes an instruction used to perform the method in the third aspect or any possible implementation of the third aspect.

According to a seventeenth aspect, a chip system is provided, including: an input interface, an output interface, at least one processor, and a memory. The input interface, the output interface, the processor, and the memory communicate with each other by using an internal connection path. The processor is configured to execute code stored in the memory. When the code is executed, the processor is configured to perform the method in the first aspect or any possible implementation of the first aspect.

According to an eighteenth aspect, a chip system is provided, including: an input interface, an output interface, at least one processor, and a memory. The input interface, the output interface, the processor, and the memory communicate with each other by using an internal connection path. The processor is configured to execute code stored in the memory. When the code is executed, the processor is configured to perform the method in the second aspect or any possible implementation of the second aspect.

According to a nineteenth aspect, a chip system is provided, including: an input interface, an output interface, at least one processor, and a memory. The input interface, the output interface, the processor, and the memory communicate with each other by using an internal connection path. The processor is configured to execute code stored in the memory. When the code is executed, the processor is configured to perform the method in the third aspect or any possible implementation of the third aspect.

DETAILED DESCRIPTION OF ILLUSTRATIVE EMBODIMENTS

The following describes technical solutions of this application with reference to the accompanying drawings.

It should be understood that the technical solutions in the embodiments of this application may be applied to various communications systems, for example, a long term evolution (LTE) system, an LTE frequency division duplex (FDD) system, an LTE time division duplex (TDD) communications system, and a future 5G communications system.

Figure 1:
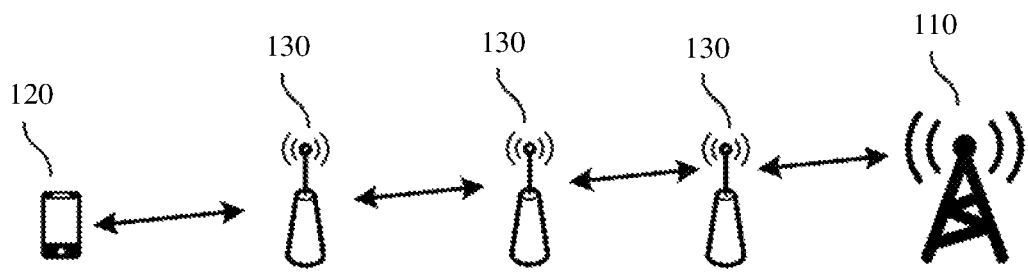
FIG. 1 is a schematic diagram of a communications system according to an embodiment of this application.

FIG. 1 shows a communications system 100 to which the embodiments of this application are applied. The communications system 100 may include at least one base station 110, at least one terminal device 120, and at least one relay node 130. The base station 110 may be an evolved NodeB (eNB or eNodeB) in an LTE system; a radio controller in a cloud radio access network (CRAN); a base station in a future 5G network (which may collectively be referred to as a next-generation radio access network node (NG-RAN node), including a gNB, an NG-eNB, a gNB with a central unit (CU) and a distributed unit (DU) separated, or the like); a baseband unit (BBU) that processes communication data, or the like; a radio access network device such as a wireless local area network (WLAN) access device in a non-3GPP system; or the like. The terminal device 120 may be mobile or fixed. The terminal device 120 may be referred to as an access terminal, user equipment (UE), a subscriber unit, a subscriber station, a mobile station, a mobile console, a remote station, a remote terminal, a mobile device, a user terminal, a terminal, a wireless communication device, a user agent, a user apparatus, or the like. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a customer-premises equipment (CPE), a residential gateway (RG), a terminal device in the future 5G network, a terminal device in a future evolved public land mobile network (PLMN), or the like.

It should be understood that the relay node 130 may be a network device, or may be a terminal device, for example, a customer-premises equipment (CPE), a residential gateway (RG), or UE, or may be a wireless backhaul node. This is not limited in the embodiments of this application.

The wireless backhaul node is configured to provide a wireless backhaul service for a node (for example, a terminal) that wirelessly accesses the wireless backhaul node. The wireless backhaul node may be a wireless backhaul node in the 5G network. For example, the wireless backhaul node in the 5G network may be referred to as an integrated access and backhaul (IAB) node, or may have another name. This is not specifically limited in the embodiments of this application.

In a wireless relay networking scenario, a relay node (RN) is connected to a donor base station (DgNB) over a wireless backhaul link, and the DgNB may be connected to a core network over a wired backhaul link. Further, in a multi-hop wireless relay networking scenario, some relay nodes are connected to the donor base station over a multi-hop wireless link. There is a hierarchical relationship between the relay node and the donor base station, and each relay node considers a node that provides a backhaul service for the relay node as a parent node. For example, as shown in FIG. 1, there is at least one relay node 130 (which is referred to as an RN 1, an RN 2, and an RN 3 in sequence from the base station 110 to the terminal device 120) between the terminal device 120 and the base station 110. An uplink data packet of the terminal device 120 served by the RN 3 is transmitted to the base station 110 via the RN 3, RN 2, and RN 1 in sequence. Subsequently, the base station 110 sends the uplink data packet to a mobile gateway device. Correspondingly, after receiving a downlink data packet from the mobile gateway device, the base station 110 sends the downlink data packet to the terminal device 120 via the RN 1, the RN 2, and the RN 3 in sequence.

It should be understood that if the relay node 130 is an IAB node, the donor base station may alternatively be referred to as an IAB donor. The IAB node may provide a wireless access service for the terminal, and is connected to the IAB donor over the wireless backhaul link, to transmit service data of a user. The IAB donor may be an integrated entity, or may be in a CU-DU separated form, that is, including a centralized unit (donor-CU) and a distributed unit (donor-DU). This is not limited in the embodiments of this application.

In FIG. 1, one base station, one terminal device, and three relay nodes are used as an example. Optionally, the communications system 100 may include a plurality of base stations, and a coverage area of each base station may include another quantity of terminal devices and another quantity of relay nodes. This is not limited in the embodiments of this application.

Optionally, the wireless communications system 100 may further include another network element or network entity such as an access management function unit, a session management function unit, or a user plane function unit. This is not limited in the embodiments of this application.

For clock synchronization in the foregoing scenario, a global positioning system (GPS) device may be configured in the donor base station, to synchronize with a network by receiving a GPS signal. Therefore, the base station may be used as a synchronization source node, so that the relay node performs clock synchronization with the synchronization source node in an air-interface synchronization manner.

In this specification, a node selected as a reference for clock synchronization (for example, a GPS synchronization capable node, namely, a node that can synchronize with the network by receiving a GPS signal) is referred to as a synchronization source node. A node that needs to perform clock synchronization with the synchronization source node is referred to as a target node. A node that assists synchronization information transmission between the target node and the synchronization source node is referred to as an intermediate node. However, it should be understood that, in the embodiments of this application, the target node and the intermediate node each may be the foregoing relay node, or may be the foregoing terminal device. This is not limited in the embodiments of this application. The synchronization source node may be the foregoing relay node, or may be the foregoing base station. This is not limited in the embodiments of this application either.

In specific implementation, there may be one or more intermediate nodes between the target node and the synchronization source node. For ease of description, the following uses an example in which a node between the target node and the synchronization source node is a first intermediate node for description.

Figure 2:
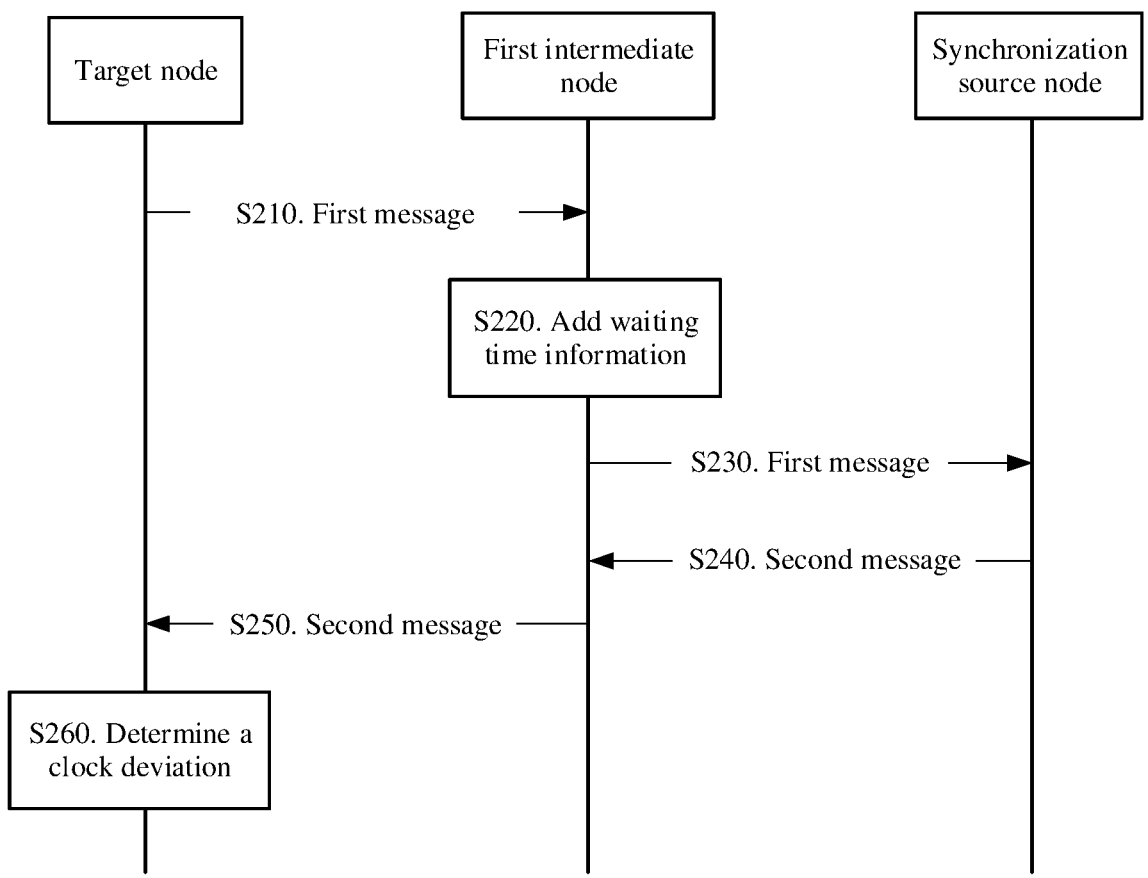
FIG. 2 is a schematic flowchart of a communication processing method according to an embodiment of this application.

FIG. 2 is a schematic flowchart of a communication processing method 200 according to an embodiment of this application. The method 200 may be applied to the communications system 100 shown in FIG. 1. However, this embodiment of this application is not limited thereto.

S210. A target node sends a first message to a synchronization source node via a first intermediate node, and the target node records a sending time of the first message.

S220. The first intermediate node receives the first message, and adds waiting time information of the first message at the first intermediate node to the first message.

S230. The first intermediate node sends the first message to the synchronization source node.

S240. The synchronization source node receives the first message sent by the target node via the first intermediate node, and sends a second message to the target node via the first intermediate node, where the second message carries a receiving time of the first message at the synchronization source node and the waiting time information of the first message at the first intermediate node.

S250. The first intermediate node receives the second message, and sends the second message to the target node.

S260. The target node receives the second message that is sent by the synchronization source node via the first intermediate node, and determines a clock deviation between the target node and the synchronization source node based on the sending time of the first message at the target node and the time information in the second message.

Specifically, the target node may send the first message whose destination address is an address of the synchronization source node, and record the sending time of the first message. The first message passes through the first intermediate node, and the first intermediate node adds the waiting time information of the first message at the first intermediate node to the first message, and then sends the first message. The synchronization source node receives the first message, records the receiving time of the first message, and then sends the second message whose destination address is an address of the target node. The first message received by the synchronization source node carries the waiting time information that is of the first message at the first intermediate node and that is added by the first intermediate node. Subsequently, the synchronization source node adds the receiving time of the first message and the waiting time information of the first message at the first intermediate node to the second message. The second message passes through the first intermediate node and arrives at the target node. The target node may determine the clock deviation between the target node and the synchronization source node based on the previously recorded sending time of the first message at the target node, the receiving time of the first message at the synchronization source node, and the waiting time information of the first message at the intermediate node. The target node may further adjust a clock of the target node based on the obtained clock deviation, to maintain clock synchronization with the synchronization source node.

According to the communication processing method in this embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance.

It should be understood that the foregoing waiting time information may include a time at which the first intermediate node receives the first message and a time at which the first intermediate node sends the first message, or may include a difference between the time at which the first intermediate node sends the first message and the time at which the first intermediate node receives the first message. This is not limited in this embodiment of this application.

It should be further understood that a source address of the first message is the address of the target node, the destination address of the first message is the address of the synchronization source node, a source address of the second message is the address of the synchronization source node, and the destination address of the second message is the address of the target node. The first intermediate node may forward a received message according to a routing protocol. In specific implementation, the target node and the synchronization source node may explicitly carry corresponding fields of the source address and the destination address in a to-be-sent message, or may indicate the source address and the destination address of the to-be-sent message in an implicit manner (for example, a channel, a bearer, or a special message type). This is not limited in this embodiment of this application.

In this specification, only the waiting time information is added by the intermediate node in a message processing process, and a format and other content of the message do not change. Therefore, for ease of description, the first message received by the first intermediate node is still referred to as the first message after the first intermediate node adds the waiting time information. The same holds true for a second message and third message, and details are not described again.

Optionally, the first message may be a delay request, and the second message may be a delay response. However, this is not limited in this embodiment of this application.

In a specific implementation, the foregoing node (for example, the target node, the intermediate node, or the synchronization source node) may determine the sending time of the message based on a start time or an end time of a physical layer frame or a subframe in which the node sends the message. Similarly, the foregoing node may determine the receiving time of the message based on a start time or an end time of a physical layer frame or a subframe in which the node receives the message.

In a possible implementation, the target node may send a plurality of first messages to the synchronization source node. The first intermediate node may add waiting time information to one of the first messages, and notify the target node of the selected first message, so that the target node may subsequently calculate the clock deviation between the target node and the synchronization source node based on a sending time of the first message selected by the first intermediate node and the time information in the received second message.

In an optional embodiment, the second message further carries a sending time of the second message at the synchronization source node and waiting time information of the second message at each intermediate node.

Before the first intermediate node sends the second message, the method further includes: adding, by the first intermediate node, waiting time information of the second message at the first intermediate node to the second message.

That the target node determines a clock deviation between the target node and the synchronization source node based on the sending time of the first message at the target node and the time information in the second message includes: determining, by the target node, the clock deviation between the target node and the synchronization source node based on the sending time of the first message at the target node, a receiving time of the second message at the target node, and the time information in the second message.

Specifically, the synchronization source node may record the sending time of the second message, and add the sending time of the second message to the second message for sending. The first intermediate node receives the second message sent by the synchronization source node, where the second message carries the sending time of the first message, the receiving time of the first message, the waiting time information of the first message at the intermediate node, and the sending time of the second message. The first intermediate node may add the waiting time information of the second message at the first intermediate node to the second message, and send the second message. The target node receives the second message, and records the receiving time of the second message. The second message received by the target node carries the receiving time of the first message, the waiting time information of the first message at the intermediate node, the sending time of the second message, and the waiting time information of the second message at the first intermediate node. Therefore, the target node may determine the clock deviation between the target node and the synchronization source node based on the sending time of the first message, the receiving time of the first message, the waiting time information of the first message at the intermediate node, the sending time of the second message, the waiting time information of the second message at the first intermediate node, and the receiving time of the second message.

In an optional embodiment, the determining a clock deviation between the target node and the synchronization source node includes: determining, by the target node, the clock deviation between the target node and the synchronization source node according to the following formula:

$$T = \left[(T_4 - T_3) - (T_2 - T_1) - \left(\sum_j T_j^{(wd)} - \sum_j T_j^{(wu)}\right)\right]/2$$

$T_4$ is the receiving time of the second message at the target node, $T_3$ is the sending time of the second message at the synchronization source node, $T_2$ is the receiving time of the first message at the synchronization source node, and $T_1$ is the sending time of the first message at the target node. A quantity of at least one intermediate node is N, where N is an integer greater than or equal to 1. j is used to represent a number of the at least one intermediate node, where j=1, ..., N. $T_j^{(wd)}$ is a waiting time of the second message at an intermediate node j, and $T_j^{(wu)}$ is a waiting time of the first message at the intermediate node j.

Specifically, wd represents waiting downlink, and wu represents waiting uplink. In this embodiment of this application, sending a message by the target node to the synchronization source node is referred to as uplink transmission, and sending a message by the synchronization source node to the target node is referred to as downlink transmission.

In the following formulas:

$$T_2 = T_1 - T + \sum_i T_i^{(p)} + \sum_j T_j^{(wu)} \quad (1)$$

$$T_4 - T = T_3 + \sum_i T_i^{(p)} + \sum_j T_j^{(wd)} \quad (2)$$

T is the clock deviation between the target node and the synchronization source node. $T_i^{(p)}$ is a transmission delay of the first message or the second message on the $i^{th}$ hop of link, where i=1, ..., N+1. $T_i^{(p)}$ is related to a distance between nodes on the $i^{th}$ hop of link and a transmission rate of an electromagnetic wave. Therefore, in this embodiment of this application, it may be considered that a sum of transmission delays on each hop of link of the first message from the target node to the synchronization source node is the same as a sum of transmission delays on each hop of link of the second message from the synchronization source node to the target node.

Therefore, to calculate T, formula (1) may be subtracted from formula (2), and then the following formula may be obtained through simple transformation:

$$T = \left[(T_4 - T_3) - (T_2 - T_1) - \left(\sum_j T_j^{(wd)} - \sum_j T_j^{(wu)}\right)\right]/2.$$

It should be understood that the at least one intermediate node includes the first intermediate node.

In an optional embodiment, before the synchronization source node receives the first message sent by the target node via the at least one intermediate node, the method further includes: sending, by the synchronization source node, a third message to the target node via the at least one intermediate node, where the third message carries a sending time of the third message at the synchronization source node.

Before the first intermediate node adds waiting time information of the first message at the first intermediate node to the first message from the target node, the method further includes: receiving, by the first intermediate node, the third message, where the third message carries the sending time of the third message at the synchronization source node; adding, by the first intermediate node, waiting time information of the third message at the first intermediate node to the third message; and sending, by the first intermediate node, the third message.

Before the target node sends the first message to the synchronization source node via at least one intermediate node, the method further includes: receiving, by the target node, the third message sent by the synchronization source node via the at least one intermediate node, where the third message carries the sending time of the third message at the synchronization source node and waiting time information of the third message at each intermediate node; and sending, by the target node based on the third message, the first message to the synchronization source node via the at least one intermediate node.

That the target node determines a clock deviation between the target node and the synchronization source node based on the sending time of the first message at the target node and the time information in the second message includes: determining, by the target node, the clock deviation between the target node and the synchronization source node based on the sending time of the first message at the target node, the time information in the second message, a receiving time of the third message at the target node, and the time information in the third message.

Specifically, the synchronization source node may record the sending time of the third message, and add the sending time of the third message to the third message for sending. The first intermediate node receives the third message, adds the waiting time information of the third message at the first intermediate node to the third message, and sends the third message. The target node receives the third message, and records the receiving time of the third message. The third message received by the target node carries the sending time of the third message at the synchronization source node and the waiting time information of the third message at the first intermediate node.

After receiving the third message, the target node sends the first message whose destination address is the synchronization source node, and records the sending time of the first message. The first message passes through the first intermediate node, and the first intermediate node adds the waiting time information of the first message at the first intermediate node to the first message, and then sends the first message. The synchronization source node receives the first message, records the receiving time of the first message, and then sends the second message whose destination address is the address of the target node. The first message received by the synchronization source node carries the waiting time information that is of the first message at the first intermediate node and that is added by the first intermediate node. Subsequently, the synchronization source node adds the receiving time of the first message and the waiting time information of the first message at the first intermediate node to the second message, and sends the second message to the target node.

The second message passes through the first intermediate node and arrives at the target node. The target node may determine the clock deviation between the target node and the synchronization source node based on the previously recorded sending time of the first message, the sending time of the third message at the synchronization source node, the receiving time of the third message at the target node, the waiting time information of the third message at the first intermediate node, and the receiving time of the first message at the synchronization source node and the waiting time information of the first message at the intermediate node that are carried in the second message.

Optionally, the third message may be a synchronization (Sync) notification. However, this is not limited in the embodiment of this application. In addition, the third message may be periodically sent by the synchronization source node, or may be sent by the synchronization source node as triggered by an event. For example, the synchronization source node sends the third message after receiving a synchronization request of the target node. This is not limited in this embodiment of this application.

In an optional embodiment, the determining a clock deviation between the target node and the synchronization source node includes: determining, by the target node, the clock deviation between the target node and the synchronization source node according to the following formula:

$$T = \left[(T_6 - T_5) - (T_2 - T_1) - \left(\sum_j T_j'^{(wd)} - \sum_j T_j'^{(wu)}\right)\right] / 2$$

$T_6$ is the receiving time of the third message at the target node, $T_5$ is the sending time of the third message at the synchronization source node, $T_2$ is the receiving time of the first message at the synchronization source node, and $T_1$ is the sending time of the first message at the target node. A quantity of the at least one intermediate node is N, where N is an integer greater than or equal to 1. j is used to represent a number of the at least one intermediate node, where j=1, ..., N. $T_j'^{(wd)}$ is a waiting time of the third message at the intermediate node j, and $T_j'^{(wd)}$ is the waiting time of the first message at the intermediate node j.

Specifically, in the following formulas:

$$T_2 = T_1 - T + \sum_i T_i'^{(p)} + \sum_j T_j'^{(wu)} \quad (3)$$

$$T_6 - T = T_5 + \sum_i T_i'^{(p)} + \sum_j T_j'^{(wd)} \quad (4)$$

T is the clock deviation between the target node and the synchronization source node. $T_j'^{(p)}$ is a transmission delay of the first message or the third message on the $i^{th}$ hop of link, where i=1, ..., N+1. $T_j'^{(p)}$ is related to a distance between nodes on the $i^{th}$ hop of link and a transmission rate of an electromagnetic wave. Therefore, in this embodiment of this application, it may be considered that a sum of transmission delays on each hop of link of the first message from the target node to the synchronization source node is the same as a sum of transmission delays on each hop of link of the third message from the synchronization source node to the target node.

Therefore, to calculate T, formula (3) may be subtracted from formula (4), and then the following formula may be obtained through simple transformation:

$$T = \left[(T_6 - T_5) - (T_2 - T_1) - \left(\sum_j T_j'^{(wd)} - \sum_j T_j'^{(wu)}\right)\right] / 2.$$

In an optional embodiment, the third message is sent by the synchronization source node and the at least one intermediate node in a broadcast or multicast manner.

Specifically, the third message may be sent by the synchronization source node and the first intermediate node in a broadcast or multicast manner. This can further reduce signaling overheads between sites.

In an optional embodiment, the method further includes: sending, by the target node, a fourth message, where the fourth message is used to indicate a hop count between the target node and the synchronization source node that can be used as a reference, and the hop count is used by another node to determine whether to select the target node as a reference for clock synchronization node and perform clock synchronization with the target node; and sending, by the first intermediate node, a fifth message, where the fifth message is used to indicate a hop count between the first intermediate node and the synchronization source node that can be used as a reference, and the hop count is used by another target node to determine whether to select the first intermediate node as a reference for clock synchronization and perform clock synchronization with the first intermediate node.

It should be understood that the synchronization source node that can be used as a reference may be a GPS synchronization capable node, a node that synchronizes with a transport network according to an IEEE 1588 protocol, or the like. This is not limited in this embodiment of this application. It should be further understood that the target node may send the fourth message in a broadcast, multicast, or unicast manner. This is not limited in this embodiment of this application either. Similarly, the first intermediate node may send the fifth message in a broadcast, multicast, or unicast manner. This is not limited in this embodiment of this application either.

Specifically, each of nodes in a network may send a hop count between the node and the synchronization source node that can be used as a reference, to help another node (another target node) that needs to perform clock synchronization select a synchronization source. In a possible implementation, another target node may select a node with a minimum hop count as the synchronization source, and perform clock synchronization with the node with the minimum hop count.

In an optional embodiment, before the target node receives the second message sent by the synchronization source node via the at least one intermediate node, the method further includes: sending, by the target node, a synchronization request message to the synchronization source node via the at least one intermediate node, where the synchronization request message is used by the target node to request to perform clock synchronization with the synchronization source node; and receiving, by the target node, a synchronization response message sent by the synchronization source node via the at least one intermediate node, where the synchronization response message is used to indicate that the synchronization source node accepts or rejects the synchronization request of the target node.

Before the synchronization source node receives the first message sent by the target node via the at least one intermediate node, the method further includes: receiving, by the synchronization source node, the synchronization request message sent by the target node via the at least one intermediate node, where the synchronization request message is used by the target node to request to perform clock synchronization with the synchronization source node; and sending, by the synchronization source node based on the synchronization request message, the synchronization response message to the target node via the at least one intermediate node, where the synchronization response message is used to indicate that the synchronization source node accepts or rejects the synchronization request of the target node.

Before the first intermediate node adds the waiting time information of the first message at the first intermediate node to the first message from the target node, and sends the first message, the method further includes: receiving, by the first intermediate node, the synchronization request message, where the synchronization request message is used by the target node to request to perform clock synchronization with the synchronization source node; forwarding, by the first intermediate node, the synchronization request message; receiving, by the first intermediate node, the synchronization response message, where the synchronization response message is used to indicate that the synchronization source node accepts or rejects the synchronization request of the target node; and forwarding, by the first intermediate node, the synchronization response message.

Specifically, before performing clock synchronization, the target node may send the synchronization request message to the synchronization source node via the at least one intermediate node, to request to perform clock synchronization with the synchronization source node. The at least one intermediate node that includes the first intermediate node forwards the synchronization request message. The synchronization source node receives the synchronization request message, determines whether to agree to serve as a synchronization source of the target node, and sends the synchronization response message to the target node via the at least one intermediate node. The at least one intermediate node that includes the first intermediate node forwards the synchronization response message. The target node receives the synchronization response message, and if the synchronization response message indicates that the synchronization source node accepts the synchronization request of the target node, the target node sends the first message to the synchronization source node, or the synchronization source node sends a third message to the target node.

In an optional embodiment, the first intermediate node is a terminal device or a relay node.

Figure 3:
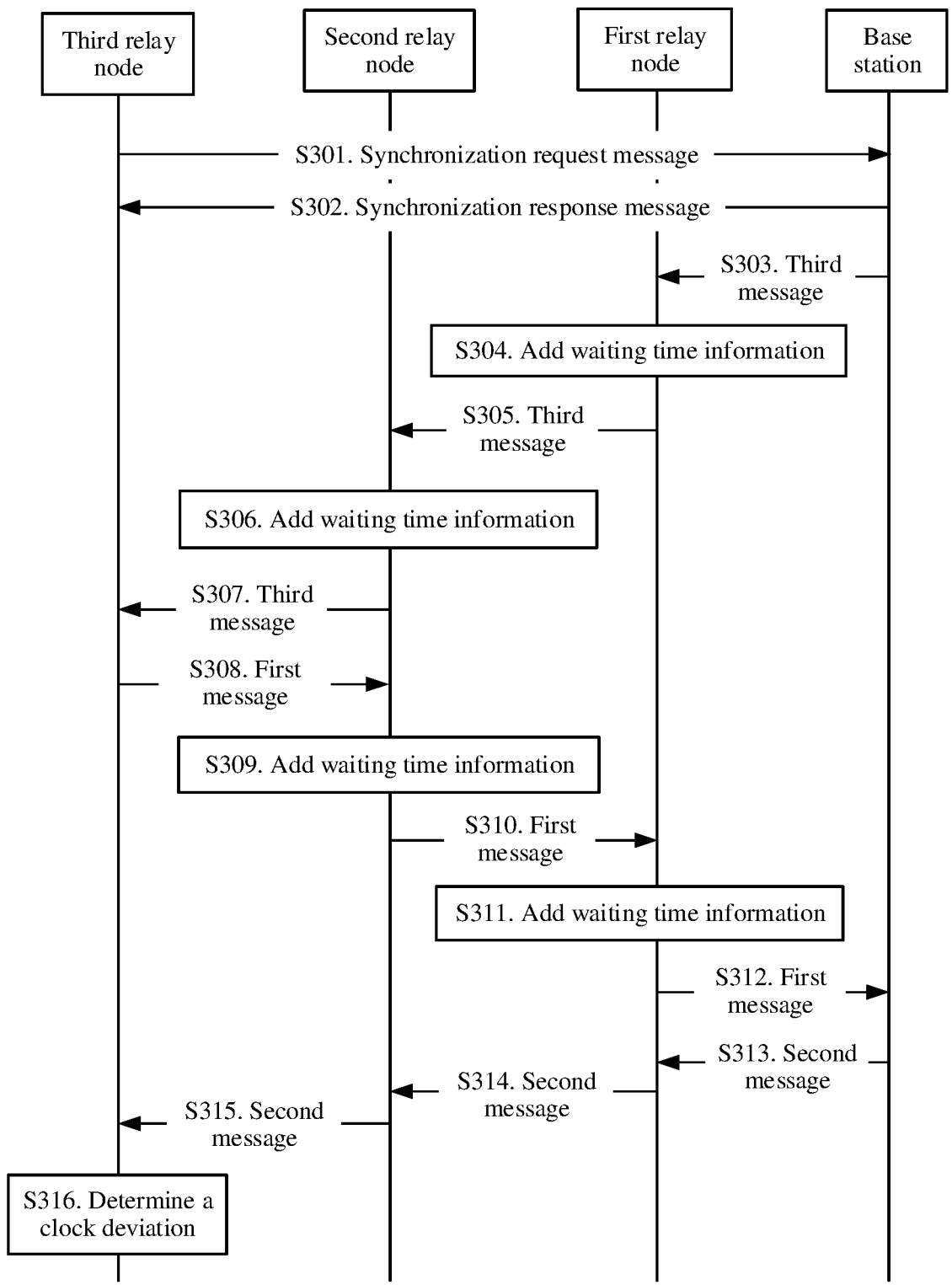
FIG. 3 is a schematic flowchart of another communication processing method according to an embodiment of this application.

FIG. 3 is a schematic flowchart of another communication processing method 300 according to an embodiment of this application. The method 300 may be applied to the communications system 100 shown in FIG. 1, but this embodiment of this application is not limited thereto. In the method 300, a third relay node is a target node, a second relay node and a first relay node are intermediate nodes, and a base station is a synchronization source node.

In S301, the third relay node sends a synchronization request message to the base station via the second relay node and the first relay node, where the synchronization request message is used to request to perform clock synchronization with the base station.

In S302, the base station receives the synchronization request message sent by the third relay node, and sends a synchronization response message to the third relay node via the first relay node and the second relay node, where the synchronization response message is used to indicate that the base station accepts a synchronization request of the third relay node. In other words, the base station agrees to serve as a synchronization source of the third relay node.

In S303, the base station sends a third message to the third relay node via the first relay node and the second relay node, where the third message may include a sending time $T_5$ of the third message.

Optionally, the third message may further include at least one of identification information of the third relay node and identification information of the base station. The third message may be a Sync notification message. The third message may be periodically sent by the base station, or may be sent by the base station as triggered by an event. For example, the base station may send the third message based on the synchronization request message of the third relay node. This is not limited in this embodiment of this application.

In S304, the first relay node receives the third message, and adds waiting time information of the third message at the first relay node to the third message.

Specifically, a time at which the first relay node receives the third message is $T'_1{}^{(rd)}$, a time at which the first relay node sends the third message is $T'_1{}^{(td)}$, and a waiting time period of the third message at the first relay node is:

$$T'_1{}^{(wd)}=T'_1{}^{(td)}-T'_1{}^{(rd)}$$

It should be understood that, the first relay node may add $R'_1{}^{(rd)}$ and $T'_1{}^{(td)}$, or $T'_1{}^{(wd)}$ as the waiting time information of the third message at the first relay node. This is not limited in this embodiment of this application.

In S305, the first relay node sends the third message to the second relay node.

In S306, the second relay node receives the third message sent by the first relay node, and adds waiting time information of the third message at the second relay node to the third message.

Specifically, a time at which the second relay node receives the third message is $T'_2{}^{(rd)}$, a time at which the second relay node sends the third message is $R'_2{}^{(td)}$, and a waiting time period of the third message at the first relay node is:

$$T'_2{}^{(wd)}=T'_2{}^{(td)}-T'_2{}^{(rd)}$$

It should be understood that, the first relay node may add $T'_2{}^{(rd)}$ and $T'_2{}^{(td)}$, or $T'_2{}^{(wd)}$ as the waiting time information of the third message at the second relay node. This is not limited in this embodiment of this application.

In S307, the second relay node sends the third message to the third relay node.

In S308, the third relay node receives the third message sent by the second relay node, records a receiving time $T_6$ of the third message, sends the first message to the base station via the second relay node and the first relay node, and records a sending time T1 of the first message. The first message may be a delay request message.

Specifically, the first message sent by the third relay node may include at least one of the following information: the sending time T1 of the first message at the third relay node, the identification information of the third relay node, and the identification information of the base station.

In S309, the second relay node receives the first message sent by the third relay node, and adds waiting time information of the first message at the second relay node to the first message.

Specifically, a time at which the second relay node receives the first message is $T_2^{(ru)}$, a time at which the second relay node sends the first message is $T_2^{(tu)}$, and a waiting time period of the first message at the second relay node is:

$$T_2^{(wu)} = T_2^{(tu)} - T_2^{(ru)}$$

It should be understood that, the second relay node may add $T_2^{(ru)}$ and $T_2^{(tu)}$, or $T_2^{(tu)}$ as the waiting time information of the first message at the second relay node. This is not limited in this embodiment of this application.

In S310, the second relay node sends the first message to the first relay node.

In S311, the first relay node receives the first message sent by the second relay node, and adds waiting time information of the first message at the first relay node to the first message.

Specifically, a time at which the first relay node receives the first message is $T_1^{(ru)}$, a time at which the first relay node sends the first message is $T_1^{(tu)}$, and a waiting time period of the first message at the first relay node is:

$$T_1^{(wu)} = T_1^{(tu)} - T_1^{(ru)}$$

It should be understood that, the first relay node may add $T_1^{(ru)}$ and $T_1^{(tu)}$, or $T_1^{(wu)}$ as the waiting time information of the first message at the first relay node. This is not limited in this embodiment of this application.

In S312, the first relay node sends the first message to the base station.

In S313, the base station receives the first message sent by the first relay node, records a receiving time $T_2$ of the first message, and sends a second message to the third relay node via the first relay node and the second relay node. The second message may be a delay response message.

Specifically, the second message carries the receiving time $T_2$ of the first message at the base station and the waiting time information of the first message at the intermediate node, that is, the waiting time period $T_j^{(wu)}$ (including the foregoing $T_1^{(wu)}$ and $T_2^{(wu)}$) of the first message at the intermediate node, or $\{T_j^{(ru)}, T_j^{(tu)}\}$ added by the intermediate node, where j is a number of the intermediate node and is an integer greater than or equal to 1. In this embodiment of this application, a quantity N of intermediate nodes is 2, and j is equal to 1 or 2. Optionally, the second message may further carry at least one of the identification information of the base station and the identification information of the third relay node. This is not limited in this embodiment of this application.

In S314, the first relay node receives the second message, and sends the second message to the second relay node.

In S315, the second relay node receives the second message, and sends the second message to the third relay node.

In S316, the third relay node receives the second message, to determine a clock deviation.

Specifically, the third relay node may calculate a clock deviation between the third relay node and the base station according to the following formula:

$$T = \left[(T_6 - T_5) - (T_2 - T_1) - \left(\sum_j T_j^{(wd)} - \sum_j T_j^{(wu)}\right)\right] / 2$$

In a possible manner, the third relay node subtracts T from a current clock value, to implement clock synchronization with the base station.

According to the communication processing method in the embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance.

Figure 4:
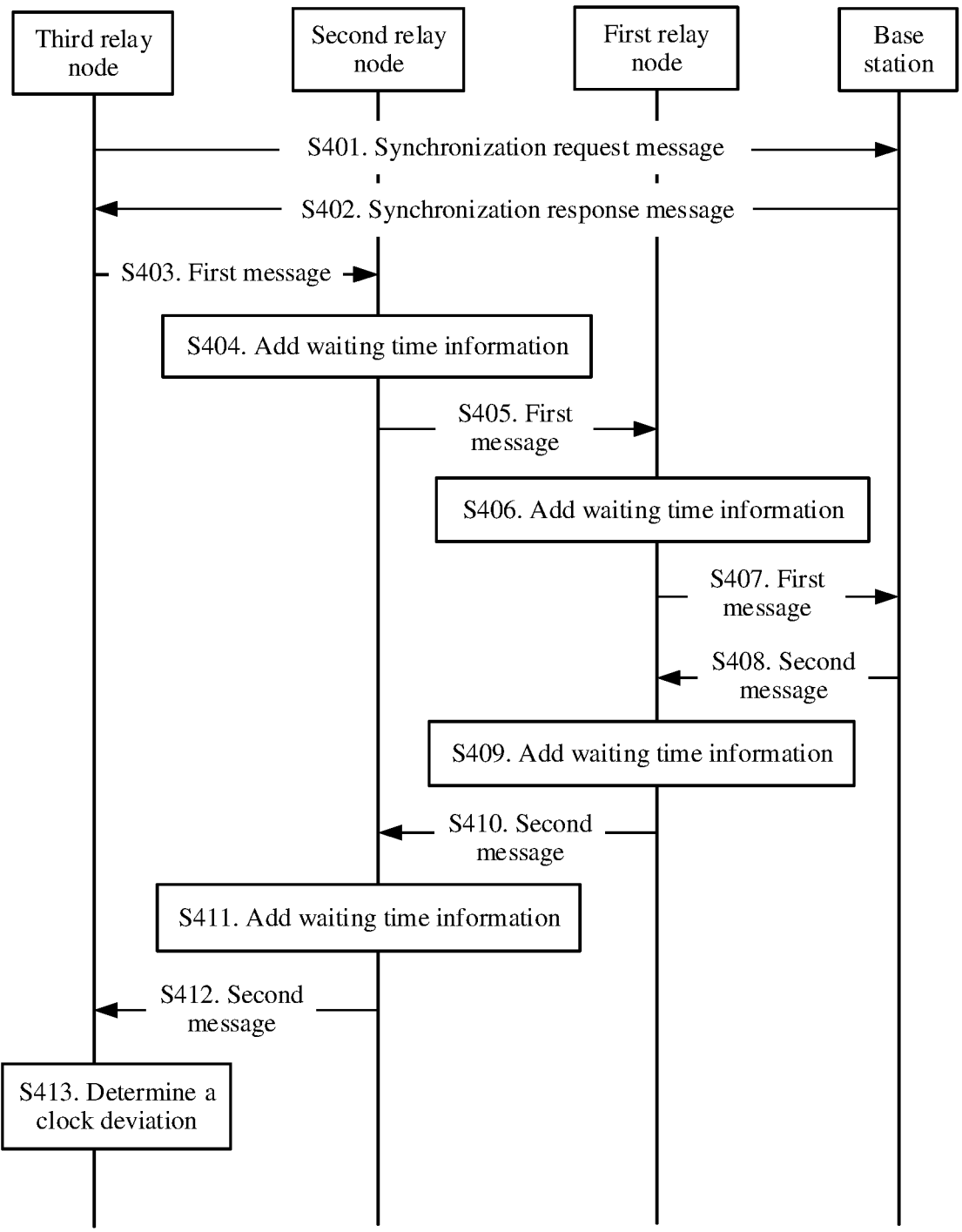
FIG. 4 is a schematic flowchart of still another communication processing method according to an embodiment of this application.

FIG. 4 is a schematic flowchart of still another communication processing method 400 according to an embodiment of this application. The method 400 may be applied to the communications system 100 shown in FIG. 1, but this embodiment of this application is not limited thereto. In the method 400, a third relay node is a target node, a second relay node and a first relay node are intermediate nodes, and a base station is a synchronization source node.

In S401, the third relay node sends a synchronization request message to the base station via the second relay node and the first relay node, where the synchronization request message is used to request to perform clock synchronization with the base station.

In S402, the base station receives the synchronization request message sent by the third relay node, and sends a synchronization response message to the third relay node via the first relay node and the second relay node, where the synchronization response message is used to indicate that the base station accepts a synchronization request of the third relay node. In other words, the base station agrees to serve as a synchronization source of the third relay node.

In S403, the third relay node sends a first message to the base station via the second relay node and the first relay node, where the first message may carry a sending time $T_1$ of the first message. Optionally, the first message may further carry at least one of identification information of the third relay node and identification information of the base station. Specifically, the first message may be a delay request message.

In S404, the second relay node receives the first message, and adds waiting time information of the first message at the second relay node to the first message.

Specifically, a time at which the second relay node receives the first message is $T_2^{(ru)}$, a time at which the second relay node sends the first message is $T_2^{(tu)}$, and a waiting time period of the first message at the second relay node is:

$$T_2^{(wu)} = T_2^{(tu)} - T_2^{(ru)}$$

It should be understood that, the second relay node may add $T_2^{(ru)}$ and $T_2^{(tu)}$, or $T_2^{(wu)}$ as the waiting time information of the first message at the second relay node. This is not limited in this embodiment of this application.

In S405, the second relay node sends the first message to the first relay node.

In S406, the first relay node receives the first message sent by the second relay node, and adds waiting time information of the first message at the first relay node to the first message.

Specifically, a time at which the first relay node receives the first message is $T_1^{(ru)}$, a time at which the first relay node sends the first message is $T_1^{(tu)}$, and a waiting time period of the first message at the first relay node is:

$$T_1^{(wu)} = T_1^{(tu)} - T_1^{(ru)}$$

It should be understood that, the first relay node may add $T_1^{(ru)}$ and $T_1^{(tu)}$, or $T_1^{(wu)}$ as the waiting time information of the first message at the first relay node. This is not limited in this embodiment of this application.

In S407, the first relay node sends the first message to the base station.

In S408, the base station receives the first message sent by the first relay node, and records a receiving time $T_2$ of the first message. The base station sends a second message to the third relay node via the first relay node and the second relay node, and records a sending time $T_3$ of the second message, where the second message may be a delay response message.

Specifically, the second message carries the sending time $T_3$ of the second message at the base station, the receiving time $T_2$ of the first message at the base station, and the waiting time information of the first message at the intermediate node, that is, the waiting time period $T_j^{(wu)}$ of the first message at the intermediate node (including the foregoing $T_1^{(wu)}$ and $T_2^{(wu)}$), or $\{T_j^{(ru)}, T_j^{(tu)}\}$ added by the intermediate node, where j is a number of the intermediate node and is an integer greater than or equal to 1. In this embodiment of this application, a quantity N of intermediate nodes is 2, and j is equal to 1 or 2. Optionally, the second message may further carry at least one of the identification information of the third relay node and the identification information of the base station. This is not limited in this embodiment of this application.

In S409, the first relay node receives the second message, and adds waiting time information of the second message at the first relay node to the second message.

Specifically, a time at which the first relay node receives the second message is $T_1^{(rd)}$, a time at which the first relay node sends the second message is $T_1^{(td)}$, and a waiting time period of the second message at the first relay node is:

$$T_1^{(wd)} = T_1^{(td)} - T_1^{(rd)}$$

It should be understood that, the first relay node may add $T_1^{(rd)}$ and $T_1^{(td)}$, or $T_1^{(wd)}$ as the waiting time information of the second message at the first relay node. This is not limited in this embodiment of this application.

In S410, the first relay node sends the second message to the second relay node.

In S411, the second relay node receives the second message sent by the first relay node, and adds waiting time information of the second message at the second relay node to the second message.

Specifically, a time at which the second relay node receives the second message is $T_2^{(rd)}$, a time at which the second relay node sends the second message is $T_2^{(td)}$, and a waiting time period of the second message at the second relay node is:

$$T_2^{(wd)} = T_2^{(td)} - T_2^{(rd)}$$

It should be understood that, the second relay node may add $T_2^{(rd)}$ and $T_2^{(td)}$, or $T_2^{(wd)}$ as the waiting time information of the second message at the second relay node. This is not limited in this embodiment of this application.

In S412, the second relay node sends the second message to the third relay node.

In S413, the third relay node receives the second message, and records a receiving time $T_4$ of the second message, to determine a clock deviation.

Specifically, the third relay node may calculate a clock deviation between the third relay node and the base station according to the following formula:

$$T = \left[(T_4 - T_3) - (T_2 - T_1) - \left(\sum_j T_j^{(wd)} - \sum_j T_j^{(wu)}\right)\right] / 2$$

In a possible manner, the third relay node subtracts T from a current clock value of the third relay node, to implement clock synchronization with the base station.

According to the communication processing method in this embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance. In addition, in this embodiment of this application, clock synchronization can be implemented through transferring of two messages. This reduces signaling interaction between the target node and the synchronization source node.

Figure 5:
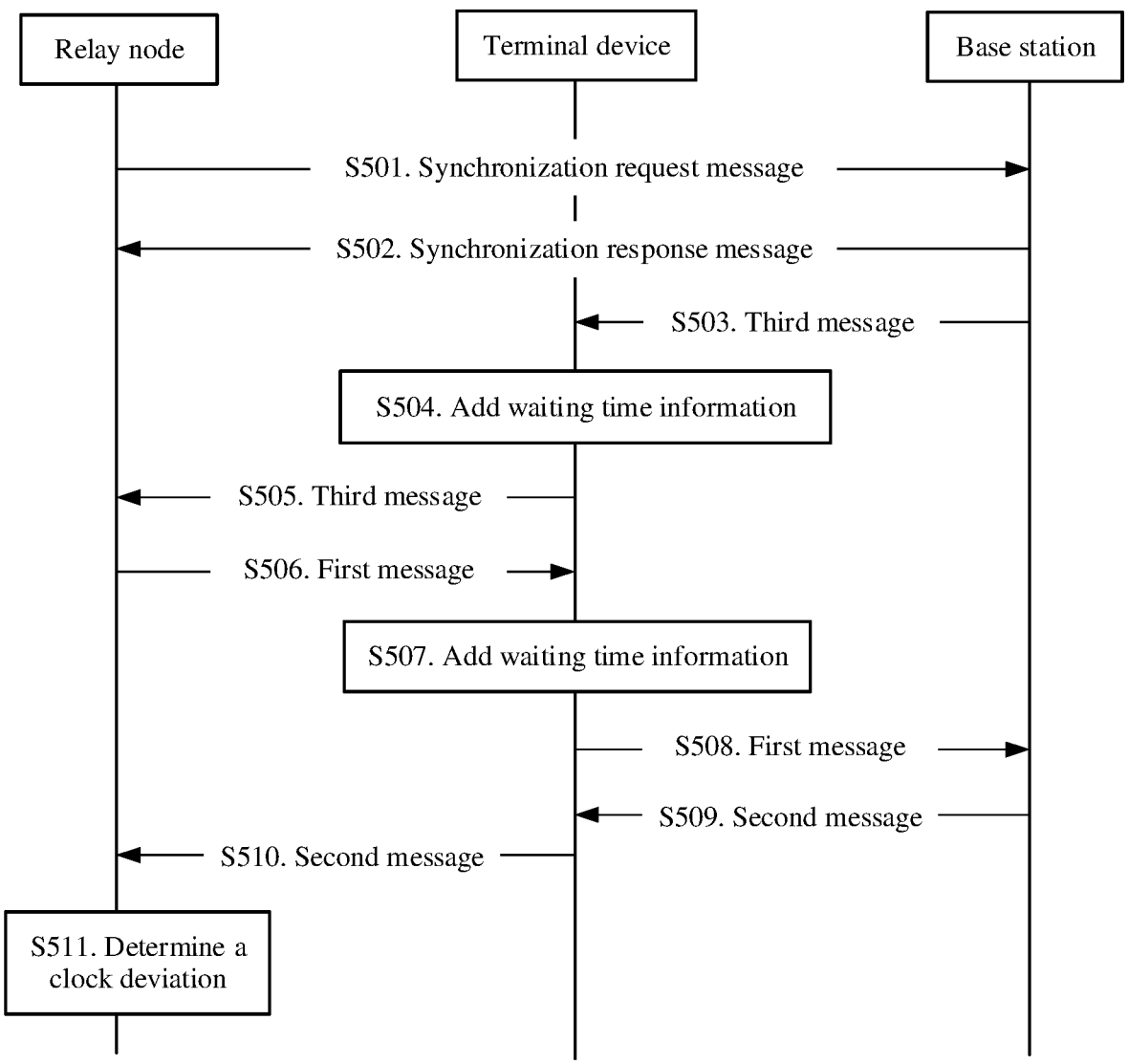
FIG. 5 is a schematic flowchart of yet another communication processing method according to an embodiment of this application.

FIG. 5 is a schematic flowchart of yet another communication processing method 500 according to an embodiment of this application. The method 500 may be applied to the communications system 100 shown in FIG. 1, but this embodiment of this application is not limited thereto. In the method 500, a relay node is a target node, a terminal device is an intermediate node, and a base station is a synchronization source node.

In S501, the relay node sends a synchronization request message to the base station via the terminal device, where the synchronization request message is used by the relay node to request to perform clock synchronization with the base station.

In S502, the base station receives the synchronization request message sent by the relay node via the terminal device, and sends a synchronization response message to the relay node via the terminal device. The synchronization response message is used to indicate that the base station receives a synchronization request of the relay node. In other words, the base station agrees to serve as a synchronization source of the relay node.

In S503, the base station sends a third message to the relay node via the terminal device, where the third message may include a sending time $T_5$ of the third message.

Optionally, the third message may further include at least one of identification information of the relay node and identification information of the base station. Specifically, the third message is a Sync notification message. The third message may be periodically sent by the base station, or may be sent by the base station as triggered by an event. For example, the base station may send the third message based on the received synchronization request message of the relay node. This is not limited in this embodiment of this application.

In S504, the terminal device receives the third message, and adds waiting time information of the third message at the terminal device to the third message.

Specifically, a time at which the terminal device receives the third message is $T_1^{(rd)}$, a time at which the terminal device sends the third message is $T'_1^{(td)}$, and a waiting time period of the third message at the terminal device is:

$$T'_1^{(wd)} = T'_1^{(td)} - T'_1^{(rd)}$$

It should be understood that, the terminal device may add $T_1^{(rd)}$ and $T_1^{(td)}$, or $T_1^{(wd)}$ as the waiting time information of the third message at the terminal device. This is not limited in this embodiment of this application.

In S505, the terminal device sends the third message to the relay node.

In S506, the relay node receives the third message sent by the terminal device, and records a receiving time $T_6$ of the third message. The relay node sends a first message to the base station via the terminal device, and records a time $T_1$ of sending the first message. The first message may be a delay request message.

Specifically, the first message sent by the relay node may include at least one of the following information: the sending time $T_1$ of the first message at the relay node, the identification information of the relay node, and the identification information of the base station.

In S507, the terminal device receives the first message, and adds waiting time information of the first message at the terminal device to the first message.

Specifically, a time at which the terminal device receives the first message is $T_1^{(ru)}$, a time at which the terminal device sends the first message is $T_1^{(tu)}$, and a waiting time period of the first message at the terminal device is:

$$T_1^{(wu)} = T_1^{(tu)} - T_1^{(ru)}$$

It should be understood that, the terminal device may add $T_1^{(ru)}$ and $T_1^{(tu)}$, or $T_1^{(wu)}$ as the waiting time information of the first message at the terminal device. This is not limited in this embodiment of this application.

In S508, the terminal device sends the first message to the base station.

In S509, the base station receives the first message sent by the terminal device, records a receiving time $T_2$ of the first message, and sends a second message to the relay node via the terminal device, where the second message may be a delay response message.

Specifically, the second message carries the receiving time $T_2$ of the first message at the base station and the waiting time information of the first message at the intermediate node, that is, the waiting time period $T_j^{(wu)}$ (including the foregoing $T_1^{(wu)}$) of the first message at the intermediate node, or $\{T_j^{(ru)}, T_j^{(tu)}\}$ added by the intermediate node, where j is a number of the intermediate node and is an integer greater than or equal to 1. In this embodiment of this application, a quantity N of intermediate nodes is 1, and j is 1. Optionally, the second message may further carry at least one of the identification information of the base station and the identification information of the third relay node. This is not limited in this embodiment of this application.

In S510, the terminal device receives the second message, and sends the second message to the relay node.

In S511, the relay node receives the second message, to determine a clock deviation.

Specifically, the relay node may calculate a clock deviation between the relay node and the base station according to the following formula:

$$T = \left[ (T_6 - T_5) - (T_2 - T_1) - \left( \sum_j T_j^{(wd)} - \sum_j T_j^{(wu)} \right) \right] / 2$$

In a possible manner, the relay node subtracts T from a current clock value, to implement clock synchronization between the relay node and the base station.

According to the communication processing method in this embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance. In addition, in this embodiment of this application, for a terminal device that can simultaneously receive data sent by the synchronization source node and data sent by the target node, synchronization between sites helps reduce interference.

Figure 6:
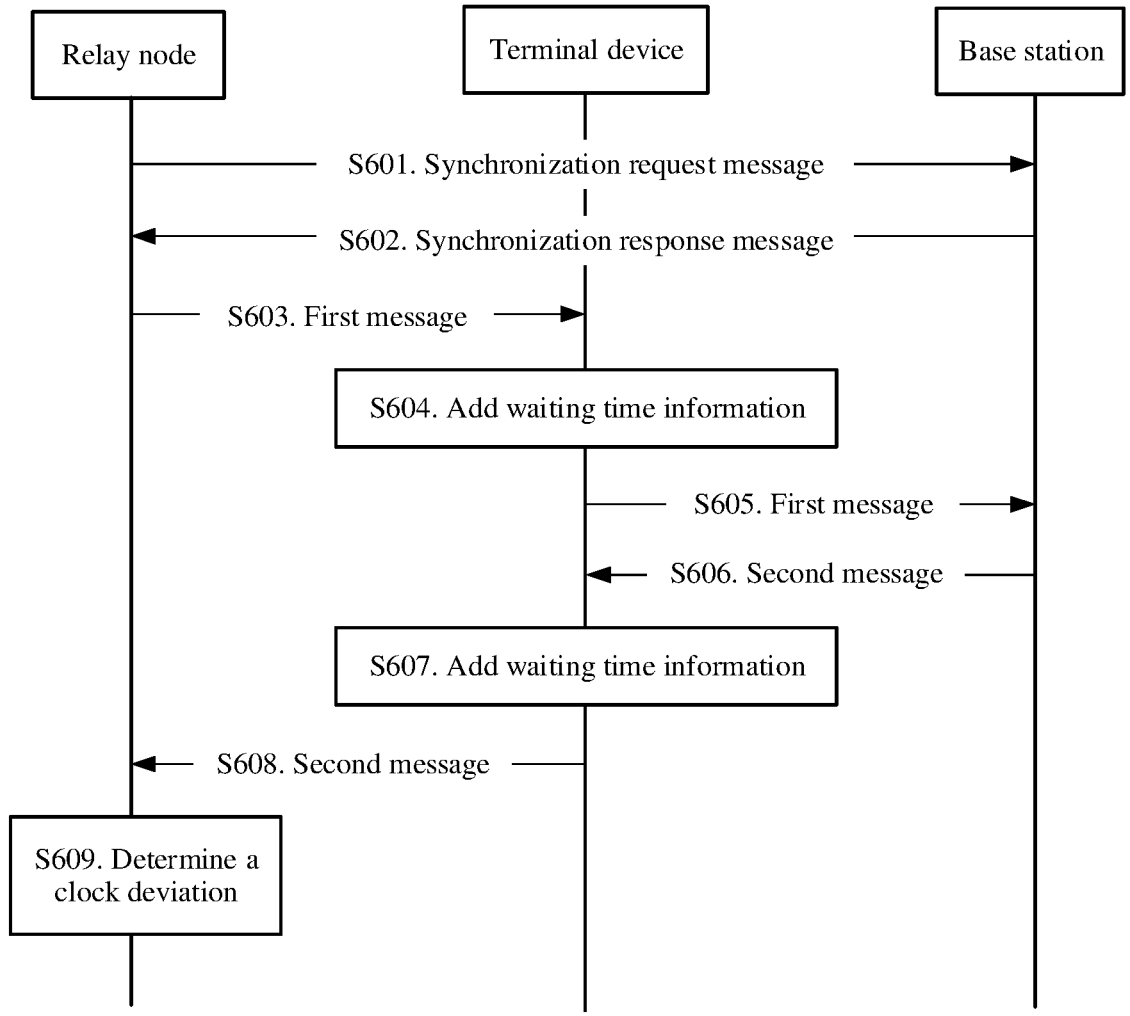
FIG. 6 is a schematic flowchart of still yet another communication processing method according to an embodiment of this application.

FIG. 6 is a schematic flowchart of still yet another communication processing method 600 according to an embodiment of this application. The method 600 may be applied to the communications system 100 shown in FIG. 1, but this embodiment of this application is not limited thereto. In the method 600, a relay node is a target node, a terminal device is an intermediate node, and a base station is a synchronization source node.

In S601, the relay node sends a synchronization request message to the base station via the terminal device, where the synchronization request message is used by the relay node to request to perform clock synchronization with the base station.

In S602, the base station receives the synchronization request message sent by the relay node via the terminal device, and sends a synchronization response message to the relay node via the terminal device. The synchronization response message is used to indicate that the base station accepts a synchronization request of the relay node. In other words, the base station agrees to serve as a synchronization source of the relay node.

In S603, the relay node sends a first message to the base station via the terminal device, and records a sending time $T_1$ of the first message. Optionally, the first message may carry at least one of the following information: the time $T_1$ at which the relay node sends the first message, identification information of the relay node, and identification information of the base station. Specifically, the first message may be a delay request message.

In S604, the terminal device receives the first message, and adds waiting time information of the first message at the terminal device to the first message.

Specifically, a time at which the terminal device receives the first message is $T_1^{(ru)}$, a time at which the terminal device sends the first message is $T_1^{(tu)}$, and a waiting time period of the first message at the terminal device is:

$$T_1^{(wu)} = T_1^{(tu)} - T_1^{(ru)}$$

It should be understood that, the terminal device may add $T_1^{(ru)}$ and $T_1^{(tu)}$, or $T_1^{(wu)}$ as the waiting time information of the first message at the terminal device. This is not limited in this embodiment of this application.

In S605, the terminal device sends the first message to the base station.

In S606, the base station receives the first message, and records a receiving time $T_2$ of the first message. The base station sends a second message to the relay node via the terminal device, and records a sending time $T_3$ at which the base station sends the second message, where the second message may be a delay response message.

Specifically, the second message carries the sending time $T_3$ of the second message at the base station, the receiving time $T_2$ of the first message at the base station, and the waiting time information of the first message at the terminal device, that is, the waiting time period $T_j^{(wu)}$ (including the foregoing $T_1^{(wu)}$) of the first message at the terminal device, or $\{T_j^{(ru)}, T_j^{(tu)}\}$ added by the terminal device, where j is a number of the intermediate node and is an integer greater than or equal to 1. In this embodiment of this application, a quantity N of intermediate nodes is 1, and j is 1. Optionally, the second message may further carry at least one of the identification information of the relay node and the identification information of the base station. This is not limited in this embodiment of this application.

In S607, the terminal device receives the second message, and adds waiting time information of the second message at the terminal device to the second message.

Specifically, a time at which the terminal device receives the second message is $T_1^{(rd)}$ a time at which the terminal device sends the second message is $T_1^{(td)}$, and a waiting time period of the second message at the terminal device is:

$$T_1^{(wd)}=T_1^{(td)}-T_1^{(rd)}$$

It should be understood that, the terminal device may add $T_1^{(rd)}$ and $T_1^{(td)}$, or $T_1^{(wd)}$ as the waiting time information of the second message at the terminal device. This is not limited in this embodiment of this application.

In S608, the terminal device sends the second message to the relay node.

In S609, the relay node receives the second message, and records a receiving time $T_4$ of the second message, to determine a clock deviation.

Specifically, the relay node may calculate a clock deviation between the relay node and the base station according to the following formula:

$$T = \left[(T_4 - T_3) - (T_2 - T_1) - \left(\sum_j T_j^{(wd)} - \sum_j T_j^{(wu)}\right)\right]/2$$

In a possible manner, the third relay node subtracts T from a current clock value of the third relay node, to implement clock synchronization between the relay node and the base station.

According to the communication processing method in this embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance. In addition, in this embodiment of this application, clock synchronization can be implemented through transferring of two messages. This reduces signaling interaction between the target node and the synchronization source node. In addition, in this embodiment of this application, for a terminal device that can simultaneously receive data sent by the synchronization source node and data sent by the target node, synchronization between sites helps reduce interference.

It should be understood that, sequence numbers of the foregoing processes do not mean execution sequences. The execution sequences of the processes should be determined according to functions and internal logic of the processes, and should not be construed as any limitation on the implementation processes of the embodiments of this application.

The foregoing describes in detail the communication processing method according to the embodiments of this application with reference to FIG. 1 to FIG. 6. The following describes in detail communication processing apparatuses according to the embodiments of this application with reference to FIG. 7 to FIG. 8.

Figure 7:
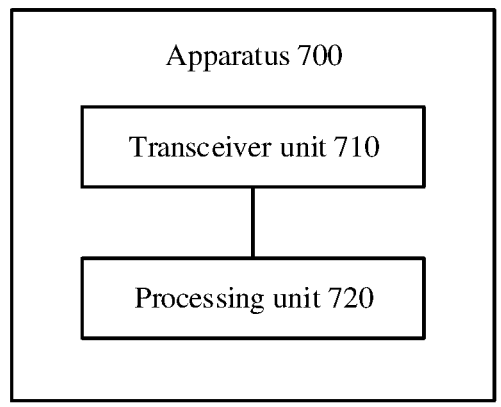
FIG. 7 is a schematic block diagram of a communication processing apparatus according to an embodiment of this application.

FIG. 7 shows a communication processing apparatus 700 according to an embodiment of this application. The apparatus 700 includes a transceiver unit 710 and a processing unit 720.

In a possible implementation, the apparatus 700 may be specifically the target node in the foregoing embodiments, and the apparatus 700 may be configured to perform procedures and/or steps corresponding to the target node in the foregoing method embodiments.

Specifically, the transceiver unit 710 is configured to receive a second message sent by a synchronization source node via at least one intermediate node, where the second message carries a receiving time of a first message from the apparatus at the synchronization source node and waiting time information of the first message at each of the at least one intermediate node.

The processing unit 720 is configured to determine a clock deviation between the apparatus and the synchronization source node based on a sending time of the first message at the apparatus and the time information in the second message.

According to the communication processing apparatus in this embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance.

Optionally, the second message further carries a sending time of the second message at the synchronization source node and waiting time information of the second message at each intermediate node. The processing unit 720 is specifically configured to determine the clock deviation between the apparatus and the synchronization source node based on the sending time of the first message at the apparatus, a receiving time of the second message at the apparatus, and the time information in the second message.

Optionally, the processing unit 720 is specifically configured to determine the clock deviation between the apparatus and the synchronization source node according to the following formula:

$$T = \left[(T_4 - T_3) - (T_2 - T_1) - \left(\sum_j T_j^{(wd)} - \sum_j T_j^{(wu)}\right)\right] \Big/ 2$$

$T_4$ is the receiving time of the second message at the apparatus, $T_3$ is a sending time of the second message at the synchronization source node, $T_2$ is the receiving time of the first message at the synchronization source node, and $T_1$ is the sending time of the first message at the apparatus. A quantity of the at least one intermediate node is N, where N is an integer greater than or equal to 1. j is used to represent a number of the at least one intermediate node, where j=1, ..., N. $T_j^{(wd)}$ is a waiting time of the second message at an intermediate node j, and $T_j^{(wu)}$ is a waiting time of the first message at the intermediate node j.

Optionally, the transceiver unit 710 is further configured to: before sending the first message to the synchronization source node via the at least one intermediate node, receive a third message sent by the synchronization source node via the at least one intermediate node, where the third message carries a sending time of the third message at the synchronization source node and waiting time information of the third message at each intermediate node. The transceiver unit 710 is further configured to send the first message to the synchronization source node based on the third message via the at least one intermediate node. The processing unit 720 is specifically configured to determine the clock deviation between the apparatus and the synchronization source node based on the sending time of the first message at the apparatus, the time information in the second message, a receiving time of the third message at the apparatus, and the time information in the third message.

Optionally, the processing unit 720 is specifically configured to determine the clock deviation between the apparatus and the synchronization source node according to the following formula:

$$T = \left[(T_6 - T_5) - (T_2 - T_1) - \left(\sum_j T_j^{(wd)} - \sum_j T_j^{(wu)}\right)\right] \Big/ 2$$

$T_6$ is the receiving time of the third message at the apparatus, $T_5$ is the sending time of the third message at the synchronization source node, $T_2$ is the receiving time of the first message at the synchronization source node, and $T_1$ is the sending time of the first message at the apparatus. A quantity of the at least one intermediate node is N, where N is an integer greater than or equal to 1. j is used to represent a number of the at least one intermediate node, where j=1, ..., N. $T_j^{(wd)}$ is a waiting time of the third message at the intermediate node j, and $T_j^{(wu)}$ is the waiting time of the first message at the intermediate node j.

Optionally, the transceiver unit 710 is further configured to: before receiving the second message sent by the synchronization source node via the at least one intermediate node, send a synchronization request message to the synchronization source node via the at least one intermediate node, where the synchronization request message is used to request to perform clock synchronization with the synchronization source node. The transceiver unit 710 is further configured to receive a synchronization response message sent by the synchronization source node via the at least one intermediate node, where the synchronization response message is used to indicate that the synchronization source node accepts or rejects a synchronization request of the apparatus.

Optionally, the third message is sent by the synchronization source node and the at least one intermediate node in a broadcast or multicast manner.

Optionally, the transceiver unit 710 is further configured to send a fourth message, where the fourth message is used to indicate a hop count between the apparatus and the synchronization source node, and the hop count is used by another apparatus to determine whether to perform clock synchronization with the apparatus.

In another possible implementation, the apparatus 700 may be specifically the synchronization source node in the foregoing embodiments, and the apparatus 700 may be configured to perform procedures and/or steps corresponding to the synchronization source node in the foregoing method embodiments.

Specifically, the transceiver unit 710 is configured to: receive a first message sent by a target node via at least one intermediate node, where the first message carries waiting time information of the first message at each of the at least one intermediate node; and send a second message to the target node based on the first message via the at least one intermediate node, where the second message carries a receiving time of the first message at the apparatus and the waiting time information of the first message at each of the at least one intermediate node.

According to the communication processing apparatus in this embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance.

Optionally, the second message further carries a sending time of the second message at the apparatus.

Optionally, the transceiver unit 710 is further configured to: before receiving the first message sent by the target node via the at least one intermediate node, send a third message to the target node via the at least one intermediate node, where the third message carries a sending time of the third message at the apparatus.

Optionally, the transceiver unit 710 is further configured to: before receiving the first message sent by the target node via the at least one intermediate node, receive a synchronization request message sent by the target node, where the synchronization request message is used to request to perform clock synchronization with the apparatus; and send a synchronization response message to the target node based on the synchronization request message via the at least one intermediate node, where the synchronization response message is used to indicate that the apparatus accepts or rejects a synchronization request of the target node.

Optionally, the third message is sent by the apparatus in a broadcast or multicast manner.

In another possible implementation, the apparatus 700 may be specifically the first intermediate node in the foregoing embodiments, and the apparatus 700 may be configured to perform procedures and/or steps corresponding to the first intermediate node in the foregoing method embodiments.

Specifically, the processing unit 720 is configured to add waiting time information of a first message at the apparatus to the first message from a target node.

The transceiver unit 710 is configured to: send the first message; receive a second message, where the second message carries a receiving time of the first message at the synchronization source node and waiting time information of the first message at each of at least one intermediate node, and the at least one intermediate node includes the apparatus; and send the second message.

According to the communication processing apparatus in this embodiment of this application, the intermediate node adds waiting time information to a message transmitted between the target node and the synchronization source node, so that the target node can calculate the clock deviation between the target node and the synchronization source node based on a sending time and receiving time of the message and a transmission delay of the message in a transmission process at the intermediate node, to perform clock adjustment. This can improve precision in clock synchronization between nodes in a multi-hop wireless relay scenario, and therefore improve system performance.

Optionally, the processing unit 720 is further configured to: before the second message is sent, add waiting time information of the second message at the apparatus to the second message.

Optionally, the transceiver unit 710 is further configured to: before the waiting time information of the first message at the apparatus is added to the first message from the target node, receive a third message, where the third message carries a sending time of the third message at the synchronization source node. The processing unit 720 is further configured to add waiting time information of the third message at the apparatus to the third message. The transceiver unit 710 is further configured to send the third message.

Optionally, the third message is sent by the synchronization source node and the apparatus in a broadcast or multicast manner.

Optionally, the transceiver unit 710 is further configured to: before the waiting time information of the first message at the first intermediate node is added to the first message from the target node, receive a synchronization request message, where the synchronization request message is used to request to perform clock synchronization with the synchronization source node; forward the synchronization request message; receive a synchronization response message, where the synchronization response message is used to indicate that the synchronization source node accepts or rejects a synchronization request of the target node; and forward the synchronization response message.

Optionally, the transceiver unit 710 is further configured to send a fifth message, where the fifth message is used to indicate a hop count between the apparatus and the synchronization source node, and the hop count is used by another target node to determine whether to perform clock synchronization with the apparatus.

Optionally, the apparatus is a terminal device or a relay node.

It should be understood that, the apparatus 700 herein is presented in a form of function unit. The term "unit" herein may refer to an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function.

It should be further understood that in another possible implementation, the communication processing apparatus may include a chip, or may be a chip. The chip may include a memory, a processor, and a communications interface. The processor and the memory communicate with each other by using an internal connection path. The processor is configured to execute code in the memory. When the code is executed, the processor is configured to perform procedures and/or steps corresponding to the foregoing apparatus 700. Details are not described herein again.

Figure 8:
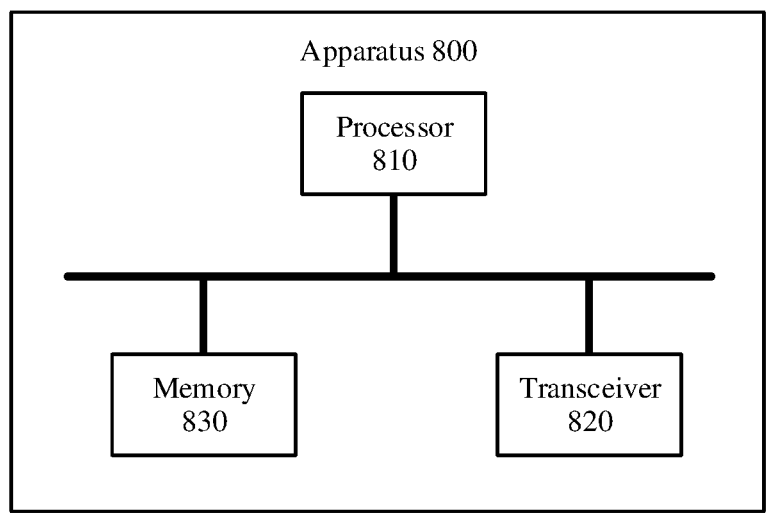
FIG. 8 is a schematic block diagram of another communication processing apparatus according to an embodiment of this application.

FIG. 8 shows another communication processing apparatus 800 according to an embodiment of this application. The apparatus 800 includes a processor 810, a transceiver 820, and a memory 830. The processor 810, the transceiver 820, and the memory 830 communicate with each other by using an internal connection path. The memory 830 is configured to store an instruction. The processor 810 is configured to execute the instruction stored in the memory 830, to control the transceiver 820 to send a signal and/or receive a signal.

In a possible implementation, the apparatus 800 may be specifically the target node in the foregoing embodiments, and may be configured to perform the steps and/or procedures corresponding to the target node in the foregoing method embodiments.

Specifically, the transceiver 820 is configured to receive a second message sent by a synchronization source node via at least one intermediate node, where the second message carries a receiving time of a first message from the apparatus at the synchronization source node and waiting time information of the first message at each of the at least one intermediate node. The processor 810 is configured to determine a clock deviation between the apparatus and the synchronization source node based on a sending time of the first message at the apparatus and the second message.

In another possible implementation, the apparatus 800 may be specifically the synchronization source node in the foregoing embodiments, and may be configured to perform the steps and/or procedures corresponding to the synchronization source node in the foregoing method embodiments.

Specifically, the transceiver 820 is configured to: receive a first message sent by a target node via at least one intermediate node, where the first message carries waiting time information of the first message at each of the at least one intermediate node; and send a second message to the target node based on the first message via the at least one intermediate node, where the second message carries a receiving time of the first message at the apparatus and the waiting time information of the first message at each of the at least one intermediate node.

In another possible implementation, the apparatus 800 may be specifically the first intermediate node in the foregoing embodiments, and may be configured to perform the steps and/or procedures corresponding to the first intermediate node in the foregoing method embodiments.

The processor 810 is configured to add waiting time information of a first message at the apparatus to the first message from a target node. The transceiver 820 is configured to: send the first message; receive a second message, where the second message carries a receiving time of the first message at the synchronization source node and waiting time information of the first message at each of at least one intermediate node, and the at least one intermediate node includes the apparatus; and send the second message.

It should be understood that, optionally, the memory 830 includes a read-only memory and a random access memory, and provides an instruction and data to the processor. A part of the memory may further include a non-volatile random access memory. For example, the memory may further store information of a device type. The processor 810 may be configured to execute the instruction stored in the memory. In addition, when the processor 810 executes the instruction stored in the memory, the processor 810 is configured to perform the steps and/or the procedures corresponding to the first intermediate node in the method embodiments.

It should be understood that in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

In an implementation process, steps in the foregoing methods can be implemented by using a hardware integrated logical circuit in the processor, or by using an instruction in a form of software. The steps of the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, or a register. The storage medium is located in the memory, and a processor reads an instruction in the memory and performs the steps in the foregoing methods in combination with hardware of the processor. To avoid repetition, details are not described herein again.

The term "and/or" in this specification describes only an association relationship for describing associated objects and indicates that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a target node, a second message sent by a synchronization source node via at least one intermediate node, wherein the second message carries first time information, and the first time information comprises:
   a receiving time of a first message at the synchronization source node, the first message being sent by the target node; and
   for each intermediate node of the at least one intermediate node, waiting time information of the first message at the respective intermediate node;

determining, by the target node, a clock deviation between the target node and the synchronization source node based on a sending time of the first message at the target node and the first time information comprised in the second message; and sending, by the target node, a fourth message, wherein the fourth message indicates a hop count between the target node and the synchronization source node, and the hop count is usable by another target node to determine whether to perform clock synchronization with the target node.

2. The method according to claim 1, wherein:

the second message further carries a sending time of the second message at the synchronization source node, and, for each intermediate node of the at least one intermediate node, waiting time information of the second message at the respective intermediate node; and determining, by the target node, the clock deviation between the target node and the synchronization source node based on the sending time of the first message at the target node and the first time information comprised in the second message comprises:

determining, by the target node, the clock deviation between the target node and the synchronization source node based on the sending time of the first message at the target node, a receiving time of the second message at the target node, and the first time information comprised in the second message.

3. The method according to claim 1, further comprising:

receiving, by the target node, a third message sent by the synchronization source node via the at least one intermediate node, wherein the third message carries second time information, and the second time information comprises:

a sending time of the third message at the synchronization source node; and for each intermediate node of the at least one intermediate node, waiting time information of the third message at the respective intermediate node; and sending, by the target node based on the third message, the first message to the synchronization source node via the at least one intermediate node; and wherein determining, by the target node, the clock deviation between the target node and the synchronization source node based on the sending time of the first message at the target node and the first time information comprised in the second message comprises:

determining, by the target node, the clock deviation between the target node and the synchronization source node based on the sending time of the first message at the target node, the first time information comprised in the second message, a receiving time of the third message at the target node, and the second time information comprised in the third message.

4. The method according to claim 3, wherein the third message is sent by the synchronization source node and the at least one intermediate node in a broadcast or multicast manner.

5. A method, comprising:

adding, by a first intermediate node to a first message received from a target node, waiting time information of the first message at the first intermediate node;

sending, by the first intermediate node, the first message;

receiving, by the first intermediate node, a second message, wherein the second message carries a receiving time of the first message at a synchronization source node, and, for each intermediate node of at least one intermediate node, waiting time information of the first message at the respective intermediate node, and the at least one intermediate node comprises the first intermediate node;

sending, by the first intermediate node, the second message; and sending, by the first intermediate node, a fifth message, wherein the fifth message indicates a hop count between the first intermediate node and the synchronization source node, and the hop count is usable by another target node to determine whether to perform clock synchronization with the first intermediate node.

6. The method according to claim 5, wherein before sending, by the first intermediate node, the second message, the method further comprises:

adding, by the first intermediate node, waiting time information of the second message at the first intermediate node to the second message.

7. The method according to claim 5, wherein before adding, by the first intermediate node to the first message from the target node, waiting time information of the first message at the first intermediate node, the method further comprises:

receiving, by the first intermediate node, a third message, wherein the third message carries a sending time of the third message at the synchronization source node;

adding, by the first intermediate node to the third message, waiting time information of the third message at the first intermediate node; and sending, by the first intermediate node, the third message.

8. The method according to claim 7, wherein the third message is sent by the synchronization source node and the first intermediate node in a broadcast or multicast manner.

9. The method according to claim 5, wherein the first intermediate node is a terminal device or a relay node.

10. A target node, comprising:

at least one processor; and a non-transitory memory storing instructions, wherein the instructions are executable by the at least one processor to cause the target node to:

receive a second message from a synchronization source node via at least one intermediate node, wherein the second message carries first time information, and the first time information comprises:

a receiving time of a first message from the target node at the synchronization source node; and for each intermediate node of the at least one intermediate node, waiting time information of the first message at the respective intermediate node;

determine a clock deviation between the target node and the synchronization source node based on a sending time of the first message at the target node and the first time information comprised in the second message; and send a fourth message, wherein the fourth message indicates a hop count between the target node and the synchronization source node, and the hop count is usable by another target node to determine whether to perform clock synchronization with the target node.

11. The node according to claim 10, wherein:

the second message further carries a sending time of the second message at the synchronization source node and, for each intermediate node of the at least one intermediate node, waiting time information of the second message at the respective intermediate node; and the instructions being executable by the at least one processor to cause the target node to determine the clock deviation between the target node and the synchronization source node based on the sending time of the first message at the target node and the first time information in the second message comprises the instructions being executable by the at least one processor to cause the target node to:

determine the clock deviation between the target node and the synchronization source node based on the sending time of the first message at the target node, a receiving time of the second message at the target node, and the first time information comprised in the second message.

12. The node according to claim 10, wherein the instructions are further executable by the at least one processor to cause the target node to:

receive a third message sent by the synchronization source node via the at least one intermediate node, wherein the third message carries second time information, and the second time information comprises:

a sending time of the third message at the synchronization source node; and for each intermediate node of the at least one intermediate node, waiting time information of the third message at the respective intermediate node; and send, based on the third message, a first message to the synchronization source node via the at least one intermediate node; and wherein the instructions being executable by the at least one processor to cause the target node to determine the clock deviation between the target node and the synchronization source node based on the sending time of the first message at the target node and the first time information comprised in the second message comprises the instructions being executable by the at least one processor to cause the target node to:

determine the clock deviation between the target node and the synchronization source node based on the sending time of the first message at the target node, the first time information in the second message, a receiving time of the third message at the target node, and the second time information in the third message.

13. The node according to claim 12, wherein the third message is sent by the synchronization source node and the at least one intermediate node in a broadcast or multicast manner.

14. A first intermediate node, comprising:

at least one processor; and a non-transitory memory storing instructions, wherein the instructions are executable by the at least one processor to cause the first intermediate node to:

add, to a first message received from a target node, waiting time information of the first message at the first intermediate node;

send the first message;

receive a second message, wherein the second message carries a receiving time of the first message at a synchronization source node, and, for each intermediate node of at least one intermediate node, waiting time information of the first message at the respective intermediate node, and wherein the at least one intermediate node comprises the first intermediate node;

send the second message; and send a fifth message, wherein the fifth message indicates a hop count between the first intermediate node and the synchronization source node, and the hop count is usable by another target node to determine whether to perform clock synchronization with the first intermediate node.

15. The node according to claim 14, wherein the instructions are further executable by the at least one processor to cause the first intermediate node to:

add waiting time information of the second message at the first intermediate node to the second message before sending the second message.

16. The node according to claim 14, wherein the instructions are further executable by the at least one processor to cause the first intermediate node to:

before adding, to the first message from the target node, waiting time information of the first message at the first intermediate node, receive a third message, wherein the third message carries a sending time of the third message at the synchronization source node;

add waiting time information of the third message at the first intermediate node to the third message; and send the third message.

17. The node according to claim 16, wherein the third message is sent by the synchronization source node and the first intermediate node in a broadcast or multicast manner.

18. The node according to claim 14, wherein the first intermediate node is a terminal device or a relay node.

* * * * *